US007020101B2

(12) United States Patent
Mantilo

(10) Patent No.: US 7,020,101 B2
(45) Date of Patent: Mar. 28, 2006

(54) METHOD OF IMPLEMENTING A REPEATER, AND A TRANSCEIVER UNIT

(75) Inventor: Kari Mantilo, Vantaa (FI)

(73) Assignee: Nokia Corporation, Espoo (FI)

( * ) Notice: Subject to any disclaimer, the term of this patent is extended or adjusted under 35 U.S.C. 154(b) by 405 days.

(21) Appl. No.: 10/170,199

(22) Filed: Jun. 13, 2002

(65) Prior Publication Data

US 2003/0026216 A1 Feb. 6, 2003

Related U.S. Application Data

(63) Continuation of application No. PCT/FI01/00873, filed on Oct. 9, 2001.

(30) Foreign Application Priority Data

Oct. 13, 2000 (FI) .................................. 20002272

(51) Int. Cl.
- H04L 5/14 (2006.01)
- H04B 3/20 (2006.01)
- H04B 7/185 (2006.01)
- H04J 1/00 (2006.01)
- H04J 3/08 (2006.01)

(52) U.S. Cl. ...................... 370/295; 370/293; 370/480; 370/501; 455/13.1

(58) Field of Classification Search ................ 370/293, 370/295, 437, 465, 480, 501; 455/13.1, 14–17; 379/338, 340

See application file for complete search history.

(56) References Cited

U.S. PATENT DOCUMENTS 6,236,664 B1   5/2001  Erreygers ................. 370/492

2002/0181458 A1* 12/2002  Amidan et al. ............ 370/389

FOREIGN PATENT DOCUMENTS

| EP | 955 744 | 11/1999 |
| EP | 1 022 892 | 7/2000 |
| EP | 1 039 716 | 9/2000 |
| WO | WO 01/50727 | 7/2001 |
| WO | WO 01/63866 | 8/2001 |

OTHER PUBLICATIONS

European Telecommunications Standards Institute, Transmission and Multiplexing; Access transmission systems on metallic access cables; Very high speed Digital Subscriber Line; Part 2: Transceiver specification, sections; Sep. 2000; sections 5.4 & 6.5.*

* cited by examiner

Primary Examiner—Chi Pham
Assistant Examiner—Ronald Abelson
(74) Attorney, Agent, or Firm—Pillsbury Winthrop Shaw Pittman LLP

(57) ABSTRACT

A method of implementing a repeater in a data transmission system, and a transceiver unit for a data transmission system is provided, whereby the transceiver unit includes a first and a second transceiver block which can function in parallel on different frequency bands with the same part of the data transmission connection, a mechanism for allowing the series connection of the transceiver blocks, and mechanisms for connecting the transceiver unit to the data transmission connection such that the receiver input and transmitter output of the first transceiver are connected to the first part of the data transmission connection and the receiver input and transmitter output of the second transceiver block are connected to the second part of the data transmission connection.

17 Claims, 3 Drawing Sheets

METHOD OF IMPLEMENTING A REPEATER, AND A TRANSCEIVER UNIT

This application is a Continuation of International Application PCT/FI01/00873 filed 9 Oct. 2001 which designated the U.S. and was published under PCT Article 21(2) in English.

FIELD OF THE INVENTION

The invention relates to a method of implementing a repeater in a data transmission system, and a transceiver unit.

BACKGROUND OF THE INVENTION

Public telephone networks usually utilize modems which transmit data at a rate of 56 kbps, for instance. In the telephone network the modems use the same frequency range as the telephones to transmit speech, the range being about 400 Hz to 4 kHz. However, the line between a switching centre and a user, i.e. the subscriber line, allows that much higher frequencies than 0 to 4 kHz and thus more data can be transmitted. This limitation to 4 kHz is due to filters which are located in switching centres and filter the additional frequencies from a signal supplied to the backbone network. Actually, in the subscriber line, typically made of a twisted copper pair, frequencies as high as several MHz can be transmitted. xDSL technologies (x Digital Subscriber Line, such as DSL, HDSL, SDSL, ADSL and VDSL) also utilize a frequency range above the usual speech frequency. By utilizing the entire frequency range, it is possible to achieve high transmission rates.

FIG. 1 illustrates the structure of an xDSL system. xDSL technologies require a special type of modem 1 for a user, and a corresponding modem 2 in a switching centre, for example, in which case the xDSL connection (such as VDSL) over a subscriber line 3 between subscriber equipment, such as a telephone 5 or a data terminal 6, and a telephone network 4 is established by means of these devices 1 and 2. The XDSL modems 1 and 2 comprise a transceiver unit, which converts a signal, such as an ATM signal, supplied to it into an xDSL signal to be transmitted to the subscriber line 3 and, on the other hand, separates the actual signal to be transferred from the xDSL signal received from the subscriber line 3. The transceiver unit can be implemented in the form of an integrated circuit, for instance.

One of the latest xDSL technologies is VDSL (Very high-speed Digital Subscriber Line), which is now being standardized at ETSI (European Telecommunications Standards Institute). In the VDSL standard proposal, two frequency bands are allocated for both directions of transmission: D1 and D2 for downstream and U1 and U2 for upstream, as shown in FIG. 2. Thus, there are four bands altogether. They can be understood as two pairs D1+U1 and D2+U2, both comprising one band in both directions of transmission. Also ANSI (American National Standards Institute) and ITU-T (International Telecommunication Union, Telecommunications sector) have put forth corresponding four-band VDSL standardization proposals. Band pairs can be named as an upper band pair (D2+U2) and a lower band pair (D1+U1). To implement the band pairs and thus the VDSL transceiver unit (VTU), two transmitters and two receivers are required when e.g. QAM technology (Quadrature Amplitude Modulation) is used and two groups of transmitters and receivers are required when DMT technology (Discrete Multi-Tone) is used. DMT technology employs several sub-carriers within a predetermined band. In the following, these entities of separate transmitter-receiver pairs or pairs of a transmitter group and receiver group, which are included in the transceiver unit and use a certain band pair, are called transceiver blocks, and thus the VDSL transceiver unit typically comprises two separate transceiver blocks, one using the band pair D1+U1, for example, and the other using the band pair D2+U2. FIG. 3 illustrates the structure of a VDSL transceiver unit 7. In addition, the figure shows an analogue front end 8, by means of which the transceiver unit 7 is connected to the subscriber line 3. The transceiver unit comprises two transceiver blocks 71 and 72, one using the band pair D1+U1 and the other using the band pair D2+U2. In addition, the figure shows blocks 73 and 74 illustrating functions common to the transceiver blocks. An apparatus utilizing the unit 7 uses input and output interfaces IN and OUT, and so the user sees only one ingoing and one outcoming data flow. The unit 7 is connected to the subscriber line 3 via transmission and reception interfaces tx and rx. Both transmission bands U1 and U2 pass through the transmission interface tx. Correspondingly, both reception bands D1 and D2 pass through the reception interface rx.

If the distance between the user and the switching centre is very long, the subscriber line is provided with repeaters, which amplify signals passing through the subscriber line in both directions. The transmission capacity (2 Mbit/s) of current, widely used PCM repeaters (Pulse Code Modulation) can be multiplied by replacing them by VDSL repeaters. Typically, the distance between PCM repeaters in the first leap is 800 m and in the next leaps 1500 m. PCM repeaters are often located in constructions controlled by the teleoperator, such as in cable manholes under streets, telephone poles etc. If PCM repeaters are replaced by VDSL repeaters, it is easiest to keep the locations of the repeaters the same as they were. Thus, also the distances between VDSL repeaters are typically 800 or 1500 m. FIG. 4 illustrates the use of repeaters on a subscriber line. In the figure, the subscriber line between modems 1 and 2 is divided into three parts 31, 32 and 33, between which there are repeaters 41 and 42. In practice, the number of repeaters on the subscriber line is arbitrary and may thus differ from the figure.

To implement a VDSL repeater, basically two transceiver units are needed; one for each repeater direction. FIG. 5 shows an obvious implementation of a VDSL repeater which utilizes two transceiver units 7A and 7B and analogue front ends 8A and 8B thereof. The transceiver units 7A and 7B correspond to the unit 7 shown in FIG. 3. The illustrated arrangement provides both parts 3A and 3B of the subscriber line with two band pairs, such as D1+U1 and D2+U2, and thus acts as a repeater between the parts.

As the frequency used in data transmission increases, signal attenuation increases, and at high frequencies the attenuation is very strong. Naturally, the attenuation, for its part, causes that the longer the line is, the weaker the signal becomes at its other end, which is why the achieved data transmission rate is lower as well.

For example, the lower (D1 +U1) band pair of the VDSL system can utilize a longer transmission link, and even a repeater distance of 1500 m typically operates well. Depending on the distance, it is possible to achieve a data transmission rate of about 6 to 10 Mbit/s symmetrically. The upper band pair (D2+U2) increases the rate at short distances, but at a repeater distance of 1500 m in particular, it is of very little significance, and thus the upper band pair is not very significant in the repeater use, but the functionality mainly depends on the lower band pair.

A problem in the above arrangement is that in a data transmission system, such as VDSL, which utilizes several transmission and reception bands, the structure of the repeater becomes too complicated with respect to the achieved advantage when a long transmission distance is employed: the transceiver blocks allocated to the upper band pair of the transceiver units are often unnecessary in the repeater use, because, due to signal attenuation, not much data passes through them.

BRIEF DESCRIPTION OF THE INVENTION

It is thus an object of the invention to provide a method and an apparatus implementing the method so that the above problems can be solved. The object of the invention is achieved by a method and a system which are characterized in what is said in the independent claims 1 and 10. The preferred embodiments of the invention are disclosed in the dependent claims.

The invention is based on the observation the applicant has made in the tests that when only one band pair is used for data transmission, in certain circumstances, such as in case of a long transmission link, a data transmission rate which is almost as high as when two or more band pairs are used can be achieved. In this case, the repeater can be implemented by one transceiver unit comprising two transceiver blocks, such that the transceiver blocks of the unit are connected with one another in series so that the blocks operate at opposite repeater distances by using only one band pair.

The method and system of the invention provide the advantage that the repeater becomes simpler and cheaper when it is implemented with one transceiver unit. In addition, the power consumption of the repeater implemented in this way is lower than that of the repeater comprising two transceiver units, and it is easier to implement the cooling and power supply of the repeater. Furthermore, the invention allows the use of the same transceiver unit structure both in the repeater and in the modem.

BRIEF DESCRIPTION OF THE FIGURES

In the following the invention will be described in greater detail in connection with the preferred embodiments, with reference to the attached drawings, in which.

DETAILED DESCRIPTION OF THE INVENTION

In the following, the invention will chiefly be applied to a VDSL system, without restricting the invention to the illustrated system or to the names of the components.

A general structure of xDSL systems, such as VDSL systems, was already described in the general part of this specification, and so, to avoid unnecessary repetitions, it is not discussed again.

Figure 1:
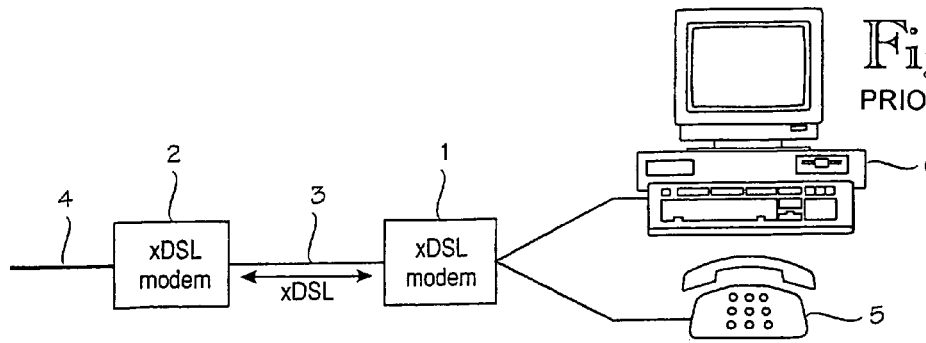
FIG. 1 is a block diagram of the basic structure of an xDSL system.
Figure 2:
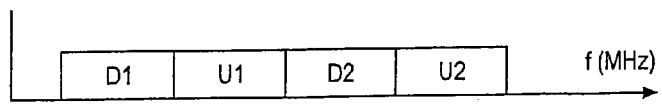
FIG. 2 illustrates the use of frequency bands in a VDSL system.
Figure 3:
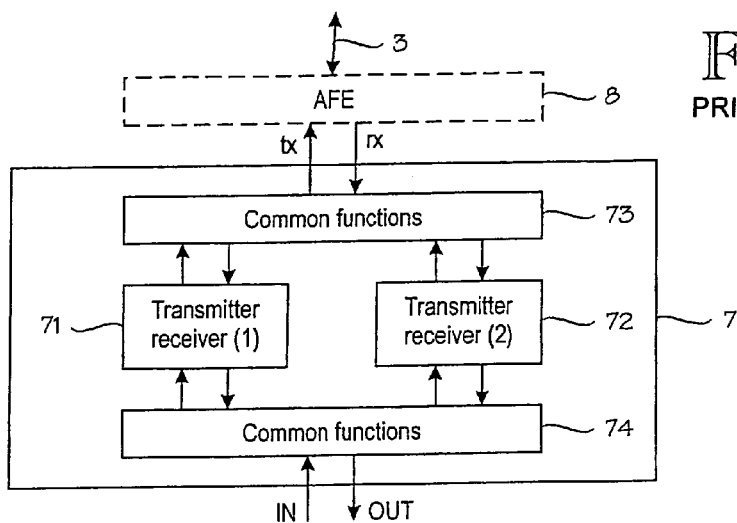
FIG. 3 illustrates the structure of a prior art VDSL transceiver unit.
Figure 4:
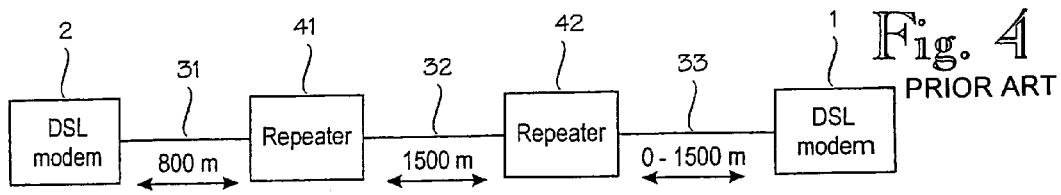
FIG. 4 illustrates how repeaters are placed on a subscriber line.
Figure 5:
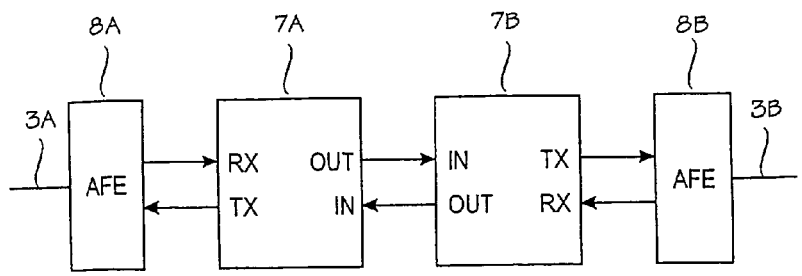
FIG. 5 illustrates the structure of a prior art VDSL repeater.

FIG. 3 illustrates the structure of a prior art VDSL transceiver unit 7. The standardization of the VDSL system is not yet finished but the proposal has been made that the system would comprise two frequency bands for both directions of transmission: downstream (in the subscriber direction) D1 and D2 and upstream (in the network direction) U1 and U2, as shown in FIG. 2. There are four bands altogether. They can be understood as two pairs: a lower one (D1+U1) and an upper one (D2+U2), both comprising one band in both directions of transmission. Correspondingly, the VDSL transceiver unit 7 comprises two transceiver blocks 71 and 72, one using the band pair D1+U1, for instance, and the other using the band pair D2+U2.

Figure 6:
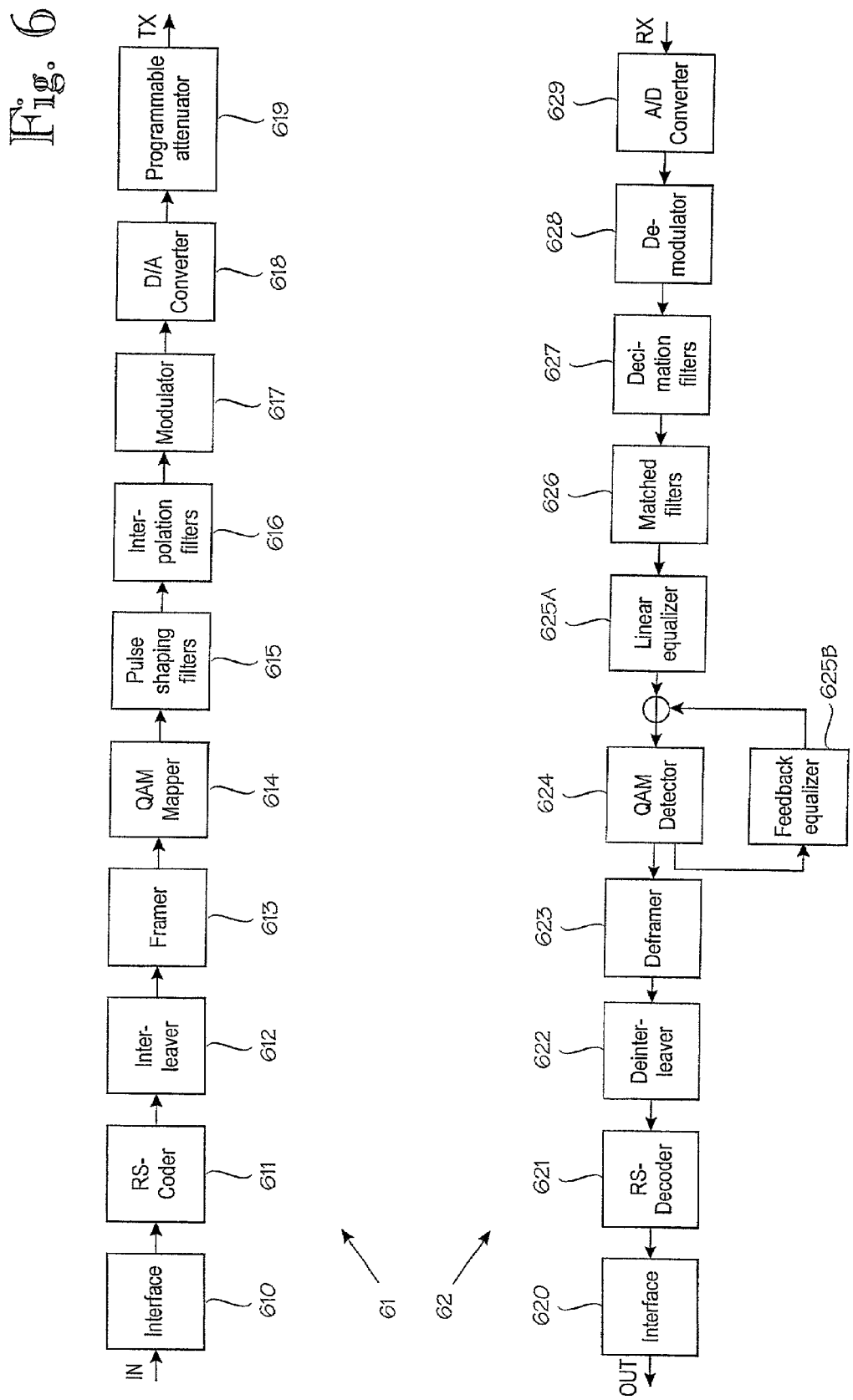
FIG. 6 illustrates the structure of a transceiver block.

FIG. 6 shows an example of a possible structure of a transceiver block 71 or 72. It is to be noted that the invention is not restricted in any way to the structure of the aforementioned type. As the first block, a transmitter branch 61 comprises an interface block 610, to which a signal IN to be transmitted is supplied. The interface block 610 may be in accordance with the UTOPIA standard, which is an interface standard defined by the ATM forum, when the data to be transmitted is in ATM format (Asynchronous Transfer Mode). The interface block 610 may quite as well be a transmission independent interface in serial or parallel mode. The next steps are Reed-Solomon coding in block 611, signal interleaving in block 612 and framing in block 613. The transmitter branch further comprises a block 614 for forming a QAM signal (Quadrature Amplitude Modulation), a pulse shaping filter block 615 and an interpolation filter block 616. Signal modulation takes place in a modulator block 617, after which it is D/A converted in block 618. The transmitter block also comprises a programmable attenuator block 619, from which the signal tx to be transmitted is forwarded in the direction of the subscriber line. A reception branch 62, for its part, comprises an A/D converter block 629, at which a received signal rx arrives from the direction of the subscriber line, a demodulator block 628 and a decimation filter block 627 and a matched filter block 626. The reception branch further comprises an equalizer block 625A and a feedback equalizer block 625B and a QAM detector block 624. The next blocks are a deframer block 623, a deinterleaver block 622 and a Reed-Solomon decoder block 621. The last block is an interface block 620, from which the received signal OUT is supplied forward. The exact functioning of the parts of the transceiver block shown in FIG. 6 is obvious to a person skilled in the art, so the operation is not described herein in greater detail. It is to be noted that the VDSL transceiver block 71 or 72 can also be based on a technology other than QAM technology described in this example, without this being significant for the basic idea of the invention. Furthermore, when e.g. DTM technology is employed, one transceiver block 71 or 72 may comprise several transmitters and receivers. What is essential is that the transceiver block 71 or 72 comprises a pair of a transmitter 61 and receiver 62 or a pair of a transmitter group and receiver group, which uses a certain band pair allocated for it.

Furthermore, FIG. 3 shows blocks 73 and 74 illustrating functions common to the transceiver blocks. In block 74, signals supplied from the different transceiver blocks 71 and 72, i.e. signals supplied on different bands on the subscriber line, are combined into one signal OUT, which is supplied to the user of the transceiver unit, and, correspondingly, an input signal IN supplied from the user is divided to the different transceiver blocks 71 and 72. Thus, the user can only see one ingoing (IN) and one outcoming (OUT) data flow in the unit 7. The block 73 comprises, for instance, a filter bank, by which transmit signals supplied from the different transceiver blocks 71 and 72 and using different bands are combined and, on the other hand, the incoming bands are separated from the signal supplied from the subscriber line 3 for the corresponding transceiver blocks. The unit 7 is connected to the subscriber line 3 via transmission and reception interfaces tx and rx. Thus, both transmission bands pass through the transmission interface tx. Correspondingly, both reception bands pass through the reception interface. In addition, the figure shows an analogue front end 8, by means of which the transceiver unit 7 is connected to the subscriber line 3. The analogue front end comprises a line transformer and filters, for example. The analogue front end 8 is typically implemented by a structure separate from the transceiver unit 7. The transceiver unit 7 and the analogue front end 8 are typically implemented as separate microcircuits, though they may also be implemented as one circuit. The implementation manner is not, however, significant for the basic idea of the invention.

Figure 7:
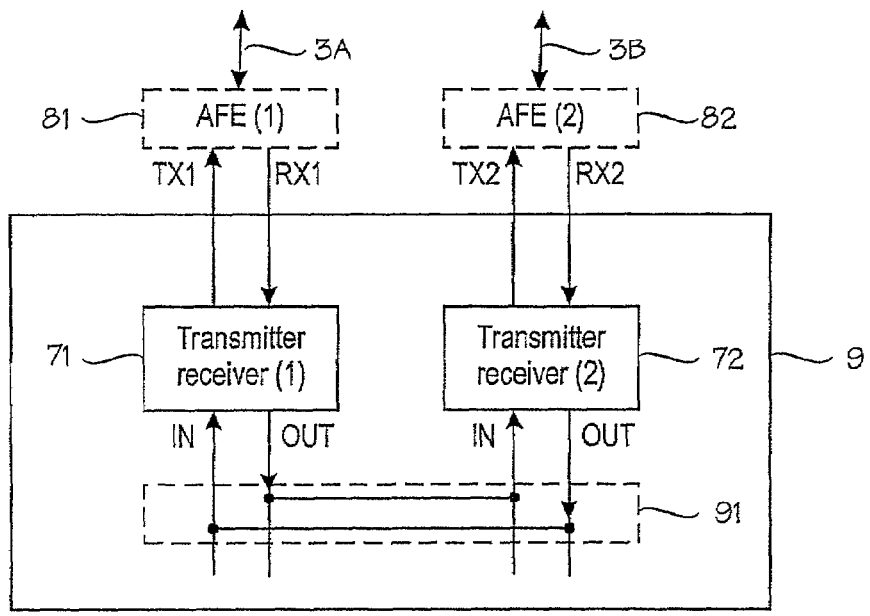
FIG. 7 illustrates the structure of the VDSL transceiver unit according to an embodiment of the invention.

FIG. 7 shows a transceiver unit 9 of the VDSL system according to an embodiment of the invention. In accordance with the basic idea of the invention, the repeater of the VDSL system can be implemented by means of one transceiver unit 9 so that the transceiver blocks 71 and 72 of the transceiver unit are connected (block 91) in series by connecting the output of the receiver of the first block 71 to the input of the transmitter of the second block 72 and the output of the receiver of the second block 72 to the input of the transmitter of the first block 71. Thus, the transceiver unit 9 can be used as a repeater between the first 3A and second part 3B of the data transmission connection so that the two transceiver blocks 71 and 72 of the unit operate at opposite repeater sections 3A and 3B, both using only one band pair. The transceiver blocks 71 and 72 of the unit 9 can be connected 91 in series on a so-called symbol level before the possible common blocks (block 74 in FIG. 3) of the band pairs, for example, the implementation of the unit being hereby at its most simplest. Alternatively, the connection 91 can partly be done after the possible common parts, in which case error correction, for instance, can be performed separately for the band pairs. For the sake of clarity, possible common functions of the transceiver blocks 71 and 72, such as error correction and filtering, are not illustrated in FIG. 7. Likewise, the interfaces in the user direction are not shown. The series connection 91 can be made permanent at the manufacturing stage of the unit implemented as an integrated circuit, for instance. However, the series connection 91 is preferably implemented by means of a switch, and the user may thus switch the function on or off. Consequently, the same transceiver unit 9 can be used in a usual way in connection with a conventional VDSL modem 1 or 2, for instance, and as a repeater 41 or 42 according to the invention. If the transceiver unit is implemented as an integrated circuit, it is thus preferable that the circuit comprises a programmable switching function as described above.

Figure 8:
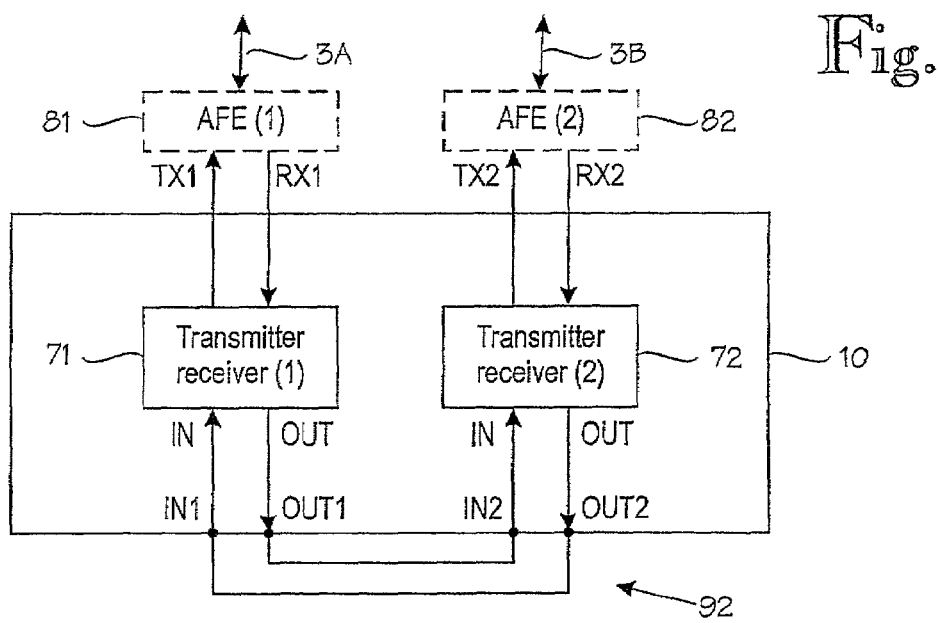
FIG. 8 illustrates the structure of the VDSL transceiver unit according to an embodiment of the invention.

FIG. 8 shows an alternative embodiment of the invention, where the transceiver blocks 71 and 72 are connected in series outside the transceiver unit 10. Thus, if required, the user of the unit 10 can implement the desired additional functions outside the unit 10. The embodiment of FIG. 8 requires separate interfaces IN1, OUT1 and IN2, OUT2 in the user direction for both transceiver blocks 71 and 72. The transceiver unit 10, like the transceiver unit 7 of FIG. 3, may also comprise interfaces which are in the user direction and common to the transceiver blocks 71 and 72, and the interfaces used at each time can be selected so as to be suitable for the use of the unit. The embodiment of the transceiver unit 10 shown in FIG. 8 also allows two-channel multiplexing, in which signals independent of each other are transferred on different band pairs over the subscriber line, because the transceiver blocks of the unit 10 can be held completely apart from one another.

The transceiver units 9 and 10 of FIGS. 7 and 8 are connected to the different parts 3A and 3B of the subscriber line 3 via different interfaces tx1, rx1 and tx2, rx2 and separate analogue front ends 81 and 82. If the transceiver blocks 71 and 72 use different band pairs, it is also possible to use common interfaces in the direction of the subscriber line, the interfaces being separated by an external filter bank, for instance, to the opposite repeater connections.

When the transceiver unit 9 or 10 is used as a repeater in accordance with the invention, both transceiver blocks 71 and 72 preferably use the same lower band pair D1+U1, whereby a long repeater connection enables a transmission rate which is higher than when upper bands are used. It is also possible to use different band pairs or the upper band pair on the opposite repeater connections 3A and 3B. It is preferable to implement at least one transceiver block 71 or 72, preferably utilizing the upper band pair D2+U2, so that it can also be configured to utilize another, preferably lower, band pair for repeater function. Both transceiver blocks 71 and 72 can also be implemented so that the bands they use can be positioned in a desired manner. Frequency bands corresponding to the respective transmission and reception bands depend on the system to which the invention is applied. The bands to be used are typically defined in the recommendations of the system, and as to frequencies of the frequency bands used in the VDSL system, for example, a reference is made to future VDSL recommendations. However, the absolute values of the cut-off frequencies or width of the frequency bands D1, D2, U1, U2, for instance, are not essential for the basic idea of the invention.

It is obvious to a person skilled in the art that as technology advances, the basic idea of the invention can be implemented in a variety of ways. The invention and the embodiments thereof are thus not restricted to the above examples but, may be modified within the scope of the claims.

What is claimed is:

1. A method of implementing a repeater in a data transmission system in which, to transmit data on a data transmission connection, at least two different frequency bands are allocated for both directions of transmission, whereby a transceiver unit of the data transmission system comprises a first and a second transceiver block which can function in parallel with each other such that they transmit and receive information on different frequency bands with the same part of the data transmission connection, the method comprising:

connecting said transceiver blocks of the transceiver unit in series by connecting the receiver output of the first block to the transmitter input of the second block and the receiver output of the second block to the transmitter input of the first block, and connecting the transceiver unit between two parts of the data transmission connection by connecting the receiver input and transmitter output of the first transceiver block to the first part of the data transmission connection and the receiver input and transmitter output of the second transceiver block to the second part of the data transmission connection, whereby the transceiver unit acts as a repeater between the first and second part of the data transmission connection.

2. The method of claim 1, further comprising connecting the transceiver blocks of the transceiver unit in series inside the transceiver unit.

3. The method of claim 1, further comprising connecting the transceiver blocks of the transceiver unit in series outside the transceiver unit.

4. The method of claim 1, further comprising setting the frequency bands used by the receivers of the first and second transceiver block of the transceiver unit to be the same.

5. The method of claim 1, further comprising setting the frequency bands used by the transmitters of the first and second transceiver block of the transceiver unit to be the same.

6. The method of claim 4, further comprising selecting from two alternative frequency bands the frequency band with a lower frequency for use.

7. The method of claim 1, wherein the transceiver unit is an integrated circuit.

8. The method of claim 1, wherein the data transmission connection is a wired connection.

9. The method of claim 8, wherein the data transmission connection is a VDSL connection.

10. A transceiver unit for a data transmission system in which, to transmit data on a data transmission connection, at least two different frequency bands are allocated for both directions of transmission, whereby the transceiver unit comprises a first and a second transceiver block which can function in parallel with each other such that they transmit and receive information on different frequency bands with the same part of the data transmission connection, means for allowing the series connection of said transceiver blocks such that the receiver output of the first block is connected to the transmitter input of the second block and the receiver output of the second block is connected to the transmitter input of the first block, and means for connecting the transceiver unit between two parts of the data transmission connection such that the receiver input and transmitter output of the first transceiver block are connected to the first part of the data transmission connection and the receiver input and transmitter output of the second transceiver block are connected to the second part of the data transmission connection.

11. The transceiver unit of claim 10, wherein the means for allowing the series connection of the transceiver blocks comprise a switch which is integrated into the transceiver unit and by means of which said series connection can be activated and/or deactivated.

12. The transceiver unit of claim 10, wherein the means for allowing the series connection of the transceiver blocks comprise connector means for connecting a switch outside the transceiver unit to the transceiver unit such that said series connection can be activated and/or deactivated by means of said outside switch.

13. The transceiver unit of claim 10, wherein the frequency bands used by the receivers of the first and second transceiver block of the transceiver unit can be set to be the same.

14. The transceiver unit of claim 10 wherein the frequency bands used by the transmitters of the first and second transceiver block of the transceiver unit can be set to be the same.

15. The transceiver unit of claim 10 wherein the transceiver unit is an integrated circuit.

16. The transceiver unit of claim 10 wherein the data transmission connection is a wired connection.

17. The transceiver unit of claim 16, wherein the data transmission connection is a VDSL connection.

* * * * *